United States Patent [19]

Diz

[11] 4,047,631
[45] Sept. 13, 1977

[54] SUGARCANE PLANTING DEVICE

[76] Inventor: Angel Diz, 1206 Georgia Ave., West Palm Beach, Fla. 33401

[21] Appl. No.: 749,161

[22] Filed: Dec. 9, 1976

[51] Int. Cl.² .............................................. B60P 1/38
[52] U.S. Cl. ..................................... 214/519; 111/3; 214/83.36
[58] Field of Search ............ 214/519, 521, 522, 83.36; 111/2, 3; 221/185, 171; 222/178

[56] References Cited

U.S. PATENT DOCUMENTS

| | | | |
|---|---|---|---|
| 3,702,664 | 11/1972 | Clement | 214/519 X |
| 3,963,138 | 6/1976 | Fowler | 214/519 |
| 3,976,214 | 8/1976 | Etwell | 214/519 |

*Primary Examiner*—Albert J. Makay

[57] ABSTRACT

A sugarcane planting device comprised of a trailer including a tongue with a hitch means for connection to a tow vehicle, the trailer is provided with a large hopper for the reception of a substantial supply of sugarcane seed pieces, a plurality of driven chains are longitudinally disposed along the bottom of the hopper to move the sugarcane seed pieces to the rear of the device where, by the forces of gravity, it enters a downwardly inclined chute provided with an angular central structure to divide the chute into a pair of opposed side chute portions, a flow of seed pieces continues through each side chute portion and outwardly into contact with a compound conveyor assembly which reorients the seed pieces so that they are discharged into furrows in a parallel relation thereto.

11 Claims, 5 Drawing Figures

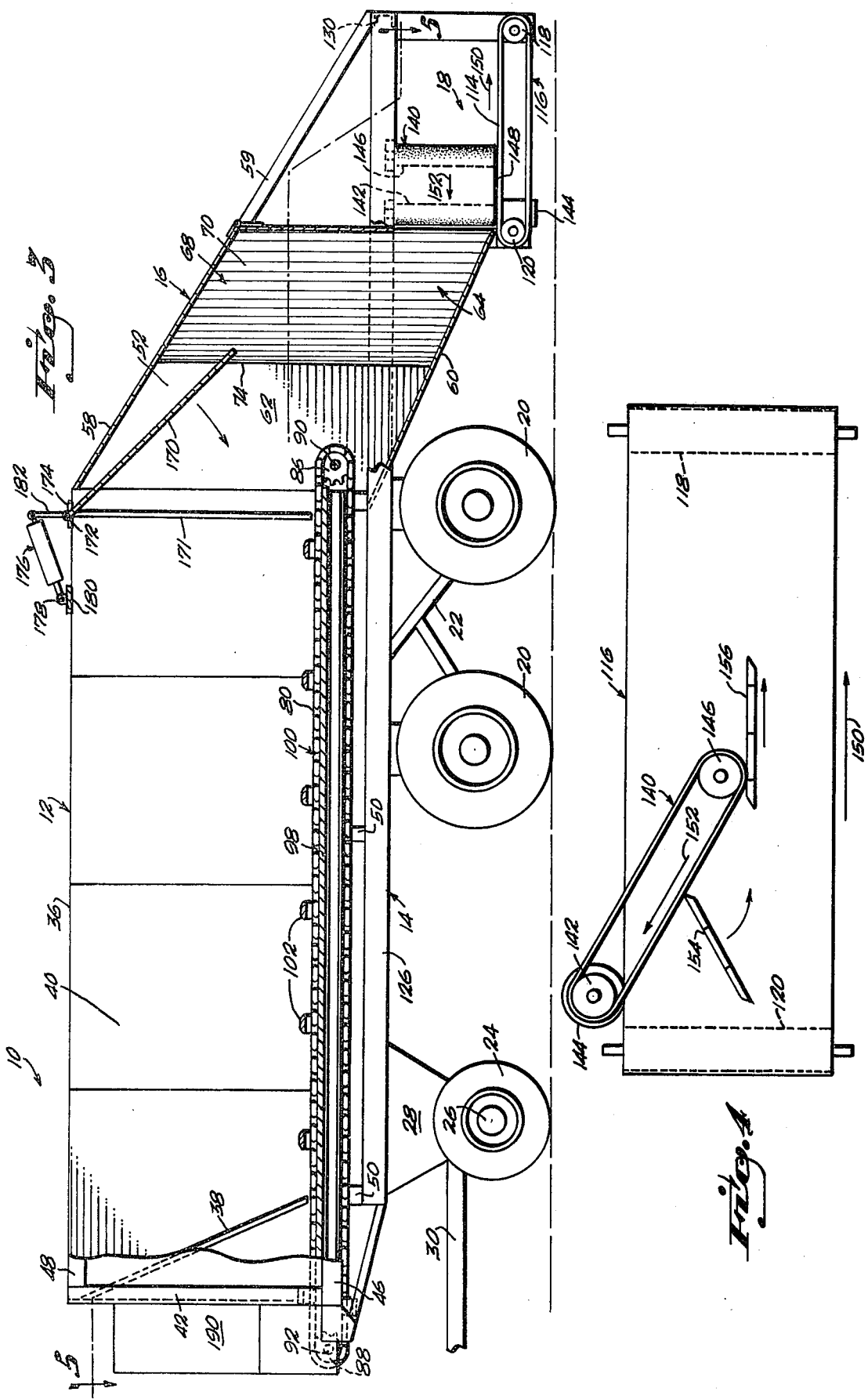

SUGARCANE PLANTING DEVICE

FIELD OF THE INVENTION

The present invention pertains to a sugarcane planting device and more particularly to a device of this nature which is adapted to carry a very substantial supply of sugarcane seed pieces and which divides a flow of seed pieces from the supply into two streams, each of which is directed onto conveyor means where the seed pieces are reoriented and discharged into a furrow in a parallel relation thereto.

BACKGROUND OF THE PRESENT INVENTION

A substantial portion of sugarcane is hand planted by either dropping short cane pieces into furrows or by hand dropping long cane stalks into the furrows and recutting them with a machete. Both planting methods are labor intensive and, at times, the labor is in short supply; therefore, efforts have been made to develop mechanical planting devices.

One type of cane seed planting aid which is currently in relatively wide use is comprised of a wagon in which the seed pieces are moved to the rear by mechanical devices so that hand droppers can easily reach it to drop it into the furrows.

A variety of other planting aid devices for cane seed have been built none of which is completely satisfactory in all respects. Therefore, one of the principal objects of the present invention is to provide a sugarcane planting device in the general form of an enlarged trailer with tongue and hitch means for attachment to a tow vehicle.

Another principal object of the invention is to provide a large hopper on the trailer to receive a very substantial supply of sugarcane seed pieces.

A further object of the instant invention is to provide means in the bottom of the hopper to move the seed pieces toward the rear end thereof.

A still further object of the present invention is to provide a downwardly inclined discharge chute for the seed pieces in the rear end portion of the hopper and divider means to separate the stream of seed pieces flowing therethrough by gravity forces into two separate opposed side streams.

Yet another principal object of the invention is to provide a compound conveyor means, disposed relative to each of the streams of cane pieces to receive same as they emerge from a chute to align the cane pieces in a parallel relation with a furrow and to discharge them thereinto.

A further object of this invention is to provide a two-row sugarcane planter device which aligns the cane pieces in the two streams in a parallel relation to two furrows and which discharges said pieces into the furrows in the parallel relationship.

BRIEF DESCRIPTION OF THE DRAWINGS

FIG. 3 is a longitudinal, vertical sectional view of the sugarcane planting device;

FIG. 4 is a generally schematic plan view of one of the parallel aligning and discharge conveyor means incorporated in the sugarcane planting device.

DESCRIPTION OF A PREFERRED FORM OF THE INVENTION

Figure 1:
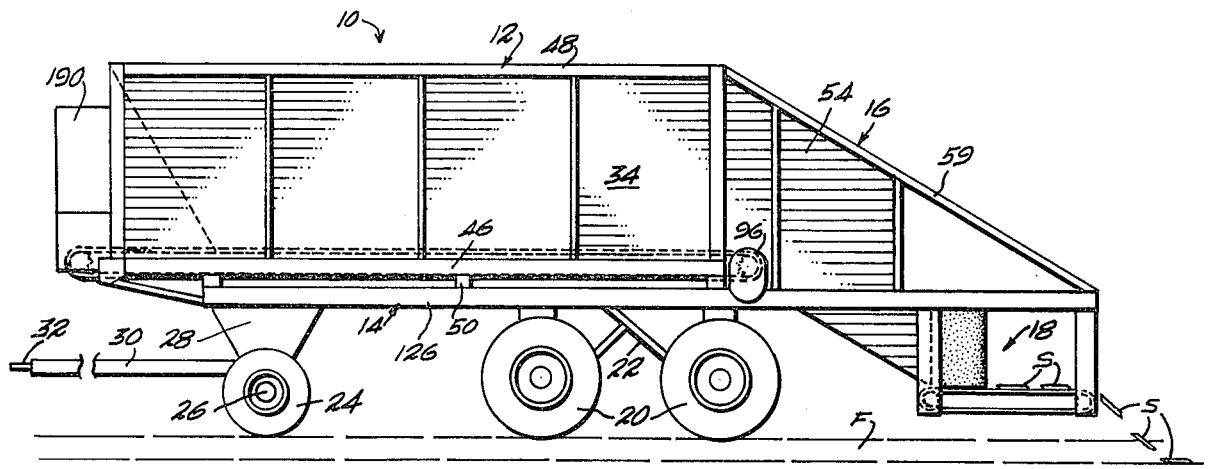
FIG. 1 is a side elevational view of the sugarcane planting device of the present invention.

With reference to the drawings in which like reference characters designated like or corresponding parts throughout the various views and with particular reference to FIG. 1, the sugarcane planting device, indicated generally at 10, is comprised generally of an enlarged hopper portion 12, fixed to a main support frame 14, and a rear discharge end portion 16 including aligning and discharge conveyor means 18. Wheels 20 are rotatably carried by an undercarriage 22 fixed to the support frame 14. A pair of front wheels 24 (one illustrated) are rotatable on an axle 26 pivotally connected to an undercarriage portion 28 and a tongue 30, fixed relative to axle 26, is provided with a hitch means 32 at its forward end for attachment to a tow vehicle (not shown) in a conventional manner.

Figure 5:
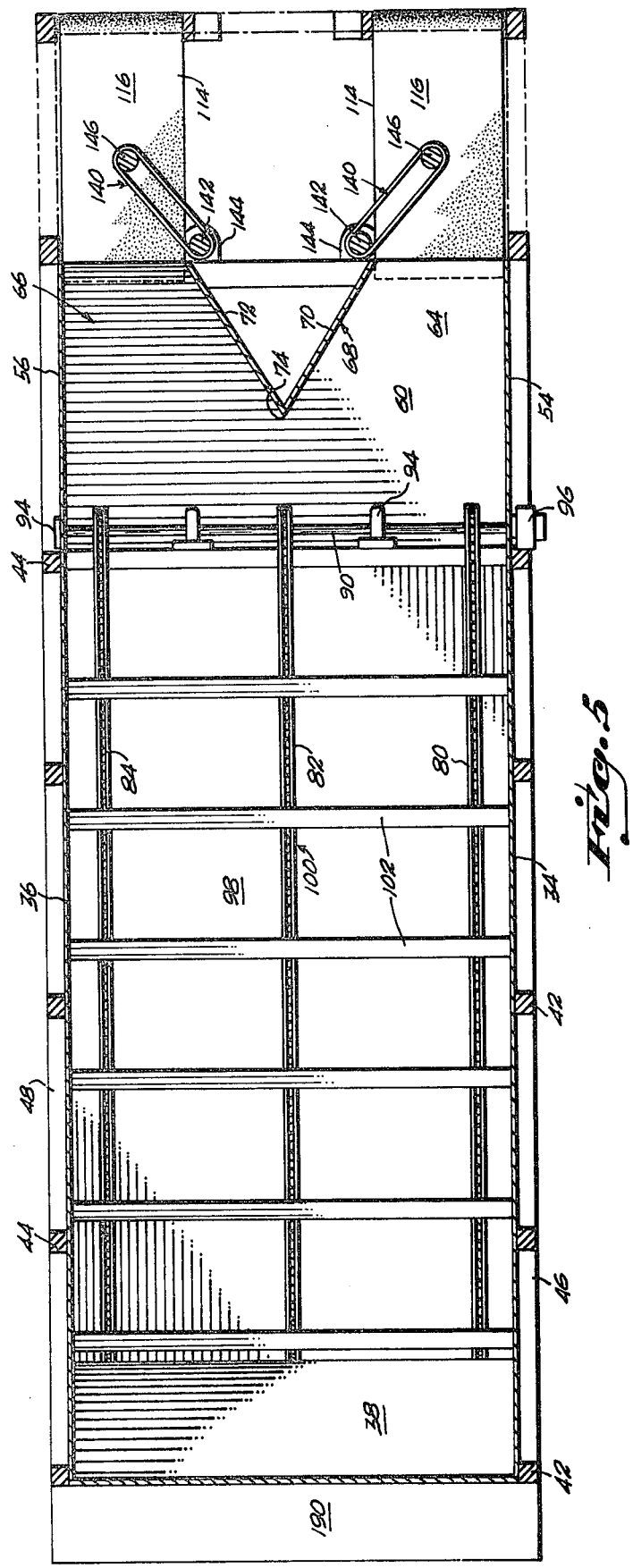
FIG. 5 is a longitudinal, horizontal section view taken generally along the line 5—5 of FIG. 1.

With reference to FIG. 3 and 5, the hopper 12 is comprised of a pair of side walls 34 and 36 and a forward, inwardly downwardly inclined front wall 38 defining an enlarged inner chamber 40. The side and front walls 34, 36 and 38 are supported by pluralities of vertical side beams 42 and 44 fixed between pairs of lower and upper horizontal side rails 46 and 48. Lower rails 46 are, in turn, fixed to a plurality of transverse rails 50 fixed across the main support frame 14.

The inner chamber 40 opens at its rear end into a chamber portion 52 which is defined by side wall extensions 54 and 56 of side walls 34 and 36. A downwardly rearwardly inclined roof 58 spans the top of side wall portions 54 and 56 between a pair of top downwardly inclined side rails 59, and a downwardly rearwardly inclined floor 60 is fixed between the lower edge of the respective side wall portions 54 and 56.

Side wall portions 54, 56 and inclined roof and floor 58 and 60 define a chute indicated generally at 62 which is divided into two rear end spaced apart chute portions 64 and 66 by a central divider 68 which is V-shaped in horizontal cross section being comprised of a pair of rearwardly diverging walls 70 and 72 from a central vertical edge 74.

As illustrated in FIGS. 3 and 5, three continuous chains 80, 82 and 84 are disposed generally along the length of the bottom of inner chamber 40, chains 80 and 84 being spaced somewhat inwardly of the respective side walls 34 and 36, with the chain 82 being longitudinally centrally disposed therealong. Each of the chains is engaged around a rearward drive sprocket 86 and a forward idler sprocket 88, the drive sprockets 86 being fixed to a common transverse drive shaft 90 and the idler sprockets 88 being similarly carried by a shaft 92.

Referring to FIG. 5, drive shaft 90 is journaled in a plurality of bearings 94 and is drivingly connected to a hydraulic speed reducer motor 96, fixed to side wall portion 54. A floor 98 closingly spans the entire bottom of inner chamber 40 beneath the top run 100 of the chains 80, 82 and 84. As illustrated in FIGS. 3 and 5, a plurality of spaced apart baffle strips 102 span the inner chamber 40 in a fixed relation to side walls 34 and 36 in a somewhat spaced above relation to the chains 80, 82 and 84.

Figure 2:
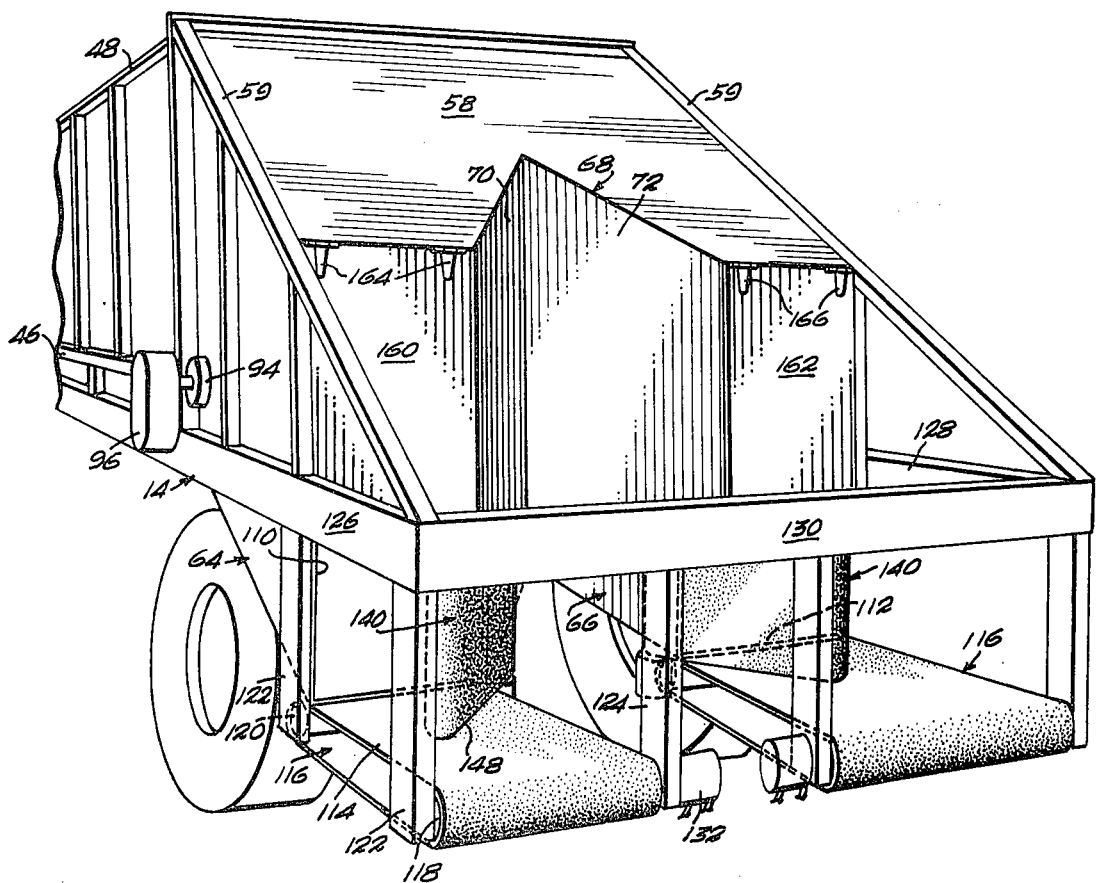
FIG. 2 is a perspective view of the rear end of the planting device of FIG. 1.

Referring now to FIGS. 2, 3 and 5, the spaced apart side chute portions 64 and 66 terminate in open rear ends 110 and 122. Each open chute end such as 110 opens onto the top run 114 of a horizontal, longitudinally disposed conveyor 116, preferably of the belt variety as illustrated. Drive and idler drums 118 and 120, provided for each conveyor belt 116, are rotatably journaled between forward and rear pairs of vertical beams 122 and 124 fixed to and extending downwardly from side and rear rails 126, 128 and 130 of main support frame 14. The belt 116 is driven by a hydraulic motor 132 carried by one vertical beam such as 124. A second belt conveyor 140, somewhat shorter in length than conveyor 116 is vertically disposed above conveyor 116 and includes a drive drum 142 connected to a hydraulic motor 144 and an idler drum 146. As best illustrated in FIGS. 4 and 5, the conveyor 140 is angled rearwardly outwardly from the drive drum 142, which is located inwardly of the front portion of conveyor 116, to the idler drum 146 which is located generally centrally of the width of conveyor 116. As best seen in FIGS. 2 and 3, the lower edge 148 of conveyor belt 140 is positioned very closely adjacent to or in kissing contact with the top surface of conveyor belt 116.

As illustrated in FIG. 4, conveyor belt 116 is driven in the direction indicated by arrow 150 to discharge sugarcane seed pieces S, which may be 20 inches long, for example, from the rear or drive end thereof into furrows F as illustrated in FIG. 1. Conveyor belt 140 is driven in the opposite direction to conveyor belt 116 as indicated by arrow 152. Therefore, when a piece of cane seed such as 154 is moving along with belt 116 in an unparallel relation to a furrow, contact with conveyor belt 140 will turn or orient it to a parallel relation to the conveyor belt 116, such as cane piece 156, which is always parallel to the furrows F during the planting operation because the sugarcane planting device is drawn along a path parallel with the furrows. The sugarcane seed pieces S are therefore discharged into the furrows F in a parallel relation therewith.

FIGS. 2 and 3 illustrate hinged door closures 160 and 162 above the respective openings 110 and 112, the hinges being designated 164 and 166. If desired, windows may be provided in doors 160 and 162.

Between the main chamber 40 and rear chamber portion 52 is a pair of pivotal doors 170 and 171 as seen in FIG. 3. Each door such as 170 is pivoted at 172 along its top edge to a transverse support 174. A hydraulic piston and cylinder assembly 176, pivoted at 178 to a transverse support 180, is operably linked at 182 to the top of door 170. Selective operation of piston and cylinder assembly 176 serves to open or close door 170 relative to one-half of the width of the opening between main chamber 40 and rear chamber portion 52. The pair of alike hydraulically operated doors 170, 171 may therefore be selectively operated to open and closed positions to open or close the full width of the opening between main chamber 40 and chamber portion 52 or individually opened to supply a flow of cane seed pieces S to either chute portion 64 or 66 to accomplish a single row planting operation.

The box 190 carried at the front of planting device 10 houses a generally conventional hydraulic system including a motor driven hydraulic pump, fluid tank, controls, etc. What is claimed is:

1. A sugarcane planting device for planting sugarcane seed pieces in ground furrows comprising:
    a trailer having front and rear ends and providing an enlarged hopper comprised of a pair of opposed side walls, a front wall and a floor defining a main inner chamber to receive a supply of sugarcane seed pieces, a main frame supporting the hopper, a first undercarriage portion fixed to said main frame and carrying a plurality of wheels, a second, front, undercarriage portion, a front wheel assembly pivotally carried by said front undercarriage portion, and a tongue and hitch assembly carried by said front wheel assembly for attachment to a tow vehicle;
    a rear end extension providing a rear end chamber portion opening at a front end into said main inner chamber and being provided with a rearwardly downwardly angled floor and a central vertical divider wall defining a pair of opposed side chutes in said chamber portion with rear openings,
    means to move the sugarcane seed pieces from said main inner chamber to said rear end chamber portion wherein the seed pieces are fed by gravity forces, by reason of said rearwardly downwardly angled floor, through said side chutes and out through said rear openings,
    conveyor means fixed relative to each of said rear openings to receive the seed pieces emerging therefrom and to orient said pieces to a parallel relation to one of the furrows and to discharge the pieces thereinto.

2. The device as defined in claim 1 wherein said rear end chamber portion includes side wall extensions of said opposed side walls.

3. The device as defined in claim 2 wherein said divider wall is generally V-shaped in horizontal cross section, being comprised of a pair of rearwardly diverging vertical wall portions from a forward, central vertical edge.

4. The device as defined in claim 1 wherein said means to move comprises a plurality of chains extending longitudinally through said hopper in a spaced apart relation, said chains being disposed around respective drive and idler sprockets fixed to respective common drive and idler shafts, and motor means to drive said drive shaft.

5. The device as defined in claim 4 wherein each of said chains includes a top run disposed along the length of said main inner chamber above the top level of said hopper floor.

6. The device as defined in claim 1 wherein each of said conveyor means includes a first motor driven horizontal longitudinally extending belt conveyor, fixed to the rear end of said rear end extension and providing a top run having a front end portion positioned to intercept the sugarcane seed pieces as they are discharged through one of said rear openings and to convey the pieces to a rear end for discharge into a ground furrow.

7. The device as defined in claim 6 wherein each of said conveyor means includes a second motor driven belt conveyor which is vertically disposed in a closely adjacent position to the top run of said first belt conveyor, said second belt conveyor having a first end vertically disposed outwardly of one side of said first conveyor front end portion and being angularly disposed to a second end, vertically positioned relative to a central portion of the top surface of said first conveyor top run.

8. The device as defined in claim 1 including a pair of hinged doors opening into said rear end chamber portion above the respective rear openings.

9. The device as defined in claim 1 including door means pivotally connected across and between said main inner chamber and rear end chamber portion.

10. The device as defined in claim 9 wherein said door means comprises two doors normally in vertically aligned closed positions, each door spanning substantially half of the width of said chambers.

11. The device as defined in claim 10 wherein each of said doors is pivotally connected at its top end to a transverse pivot means spanning the top of said hopper and including a hydraulic cylinder and piston means operably connected to said top end by link means connecting between said top end and piston in a manner so as to permit selective opening and closing of said door by actuation of said cylinder and piston means.

* * * * *